United States Patent
Bernsen et al.

(10) Patent No.: US 12,041,452 B2
(45) Date of Patent: *Jul. 16, 2024

(54) NON-3GPP DEVICE ACCESS TO CORE NETWORK

(71) Applicant: KONINKLIJKE PHILIPS N.V., Eindhoven (NL)

(72) Inventors: Johannes Arnoldus Cornelis Bernsen, Eindhoven (NL); Walter Dees, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,249

(22) Filed: Jun. 8, 2023

(65) Prior Publication Data

US 2023/0328524 A1    Oct. 12, 2023

Related U.S. Application Data

(63) Continuation of application No. 17/272,314, filed as application No. PCT/EP2019/073029 on Aug. 29, 2019, now Pat. No. 11,711,693.

(30) Foreign Application Priority Data

Aug. 30, 2018  (EP) .................................... 18191757

(51) Int. Cl.
*H04W 12/72*  (2021.01)
*H04L 9/30*  (2006.01)
(Continued)

(52) U.S. Cl.
CPC ........... *H04W 12/08* (2013.01); *H04L 9/3073* (2013.01); *H04W 12/0433* (2021.01);
(Continued)

(58) Field of Classification Search
CPC ... H04W 12/08; H04W 12/72; H04W 12/069; H04W 84/12; H04W 12/0433; H04L 9/3073
See application file for complete search history.

(56) References Cited

U.S. PATENT DOCUMENTS 9,648,019 B2 * 5/2017 Khello ................. H04W 12/06
10,904,751 B2 1/2021 Abdulrahiman
(Continued)

FOREIGN PATENT DOCUMENTS

| WO | 2015149724 A1 | 8/2015 |
| WO | 2016129210 A1 | 8/2016 |
| WO | 2017165488 A1 | 9/2017 |

OTHER PUBLICATIONS

International Search Report and written opinion from PCT/EP2019/073029 Mailed Oct. 7, 2019.
(Continued)

*Primary Examiner* — Yuwen Pan
*Assistant Examiner* — Farideh Madani

(57) ABSTRACT

A non-SI device (120) is arranged for wireless communication (130) and cooperates with an SI device (110) having access to a subscriber identity. The non-SI device has a transceiver (121) to communicate in a local network and a processor (122) to establish an association with the SI. A non-SI public key is provided to the SI device via a first communication channel. A verification code is shared with the SI device via a second communication channel. The channels are different and include an out-of-band channel (140). Proof of possession of a non-SI private key is provided to the SI device via the first or the second communication channel. From the SI device, security data is received that is related to the SI and is computed using the non-SI public key. The security data reliably enables the
(Continued)

non-SI device to access the core network via the local network and a gateway between the local network and the core network.

19 Claims, 7 Drawing Sheets

(51) Int. Cl.
*H04W 12/0433* (2021.01)
*H04W 12/069* (2021.01)
*H04W 12/08* (2021.01)
*H04W 84/12* (2009.01)

(52) U.S. Cl.
CPC ......... *H04W 12/069* (2021.01); *H04W 12/72* (2021.01); *H04W 84/12* (2013.01)

(56) References Cited

U.S. PATENT DOCUMENTS

| | | |
|---|---|---|
| 2016/0227410 A1 | 8/2016 | Narasimha |
| 2017/0280324 A1* | 9/2017 | Beals ................... H04W 12/06 |
| 2018/0004929 A1 | 1/2018 | Sakai |
| 2018/0234833 A1* | 8/2018 | Tang .................... H04W 88/06 |
| 2021/0258787 A1 | 8/2021 | Bernsen et al. |

OTHER PUBLICATIONS

Diffie, W.; Hellman, M. (1976), "New directions in cryptography", IEEE Transactions on Information Theory, 22 (6):644-654.
3rd Generation Partnership Project Technical Specification Jun. 2018.

* cited by examiner

NON-3GPP DEVICE ACCESS TO CORE NETWORK

CROSS-REFERENCE TO PRIOR APPLICATIONS

This application a continuation of U.S. application Ser. No. 17/272,314 filed Feb. 28, 2021, which claims the benefit of International Application No. PCT/EP2019/073029 filed on Aug. 29, 2019, which claims the benefit of European Patent Application No. 18191757.6 filed on Aug. 30, 2018. These applications are hereby incorporated by reference herein.

FIELD OF THE INVENTION

The invention relates to a non-subscriber identity, non-SI, device arranged for wireless communication in a local network according to a local communication protocol. The invention further relates to a subscriber identity, SI, device and methods for use in an SI system.

The present invention relates to the field of integration of local wireless communication devices into at least regional area mobile communication systems, further called core networks, e.g. 3G, LTE, 4G or 5G networks. Access to core networks is managed by so-called providers, which provide access to core networks for mobile devices of subscribers using a set of subscriber data called the subscriber identity SI. The SI comprises subscriber identity data for accessing a core network, for a respective subscriber to the provider.

In general, such local wireless communication devices are equipped for wireless communication according to a local communication protocol, such as Wi-Fi, and do not have a transceiver unit for wireless communication with a core network. For example, in the so-called Internet of Things, various types of local wireless communication devices may be connectable to the internet via Wi-Fi, e.g. so-called headless devices not having a user interface or so-called UI devices have a user interface like a touch screen, display and/or buttons. So, at least initially, such devices do not have any subscriber identity data or credentials that are required to access a core network. Such local wireless communication devices are called non-SI devices in this document.

The integration of non-SI devices into core networks is currently discussed between various parties called 3GPP that define new generations and extensions of the existing core networks. The 3rd Generation Partnership Project (3GPP) is a collaboration between groups of telecommunications standards associations, known as the Organizational Partners. 3GPP proposes several mechanisms to allow a mobile device, in 3GPP terms called a UE or User Equipment, to access the core cellular network using a non-3GPP access network, such as Wi-Fi, e.g. for offloading cellular traffic over other access networks. Non-3GPP access to a 4G core network, called Evolved Packet Core or EPC, is specified amongst others in 3GPP specifications: [TS 23.402] (latest version 15.3.0), [TS 24.302] (latest version 15.3.0) and [TS 33.402} (latest version 15.1.0). Non-3GPP access to the 5G core network is specified amongst others in 3GPP specifications: [TS 23.501] (latest version 15.2.0) section 4.2.8, [TS 23.502] (latest version 15.2.0) section 4.12 and [TS 24.502] (latest version 15.0.0). Currently, the work focusses on supporting non-3GPP devices behind a residential gateway (RG), but this might be extended to more generic support of non-3GPP devices, given the demand of 5G cellular operators to incorporate Wi-Fi as part of their 5G network offering and use their services (such as metered voice over Wi-Fi, live video services, etc.).

Commonly mobile devices like smartphones are equipped provided with a dedicated transceiver for communication with a core network and are further provided with a subscriber identity, SI. The SI represents the identity of a subscriber and further data required to access the core network, while use of the core network is billed by the provider to the respective subscriber, e.g. via a so-called bundle of voice and data. For example, the SI may comprise a subscriber identity code like IMSI (International Mobile Subscriber Identity). Such devices usually are provided with the SI by inserting a physical semiconductor module called SIM into the mobile device. A SIM card is an integrated circuit embedded in a plastic card that is intended to securely store the international mobile subscriber identity (IMSI) number and its related keys, which are used to identify and authenticate subscribers on mobile telephony devices (such as mobile phones and computers). Various types of modules or cards are known, e.g. USIM which refers to Universal Subscriber Identity Module and works on UNITS Universal Mobile Telecommunications System, which is a 3G core network standard. The related physical card is also known as UICC (Universal Integrated Circuit Card) and USIM is an application running on top of UICC. A further type of SIM is called e-SIM or eSIM (embedded SIM) or embedded universal integrated circuit card (eUICC). It is a non-replaceable embedded chip that is soldered directly onto a circuit board. For now, any type of device that is equipped for wireless communication with a core network and is provided with an original SI, either via a SIM card or otherwise, is called a SIM device in this document.

Furthermore, SI data may also be available at other locations like a management system of the provider of the core network, e.g. in a subscriber database on a server managing the subscriber identity data while subscriber credentials may be authenticated and authorized using an authorization server, usually called a certificate authority, CA. For example, the SI data may be also accessed by the subscriber by logging in to a user account on an application server, AS, via the internet using user credentials like a user name and password or using a two-factor authorization. The AS may be coupled to, or may comprise, the subscriber database and the CA.

In this document, a so-called SI device is a local device having access to the SI, either comprising the SI or being coupled to at least one provider server of the core network, which server is arranged to manage the SI data. The SI device is arranged to communicate to the non-SI device and has access to the CA. A first example of an SI device is a SIM device arranged for communicating via the core network to one or more servers that store a subscriber database and the CA, while also being arranged to communicate to the non-SI device. A further example of the SI device is a user interface, UI, device for communicating to the non-SI device, which UI device is further arranged to access the SI data and the CA on severs via the core network and where the subscription owner has to log in for getting access to the SI data. Another example is a UI device arranged to communicate via the local network to the non-SI device, while the UI device is further arranged to access the SI data and the CA on servers via a connection to the internet. An SI system may include a server-based management system coupled to a local access point for wireless communication in a local network, and also the above defined SIM device or the UI device properly coupled to respective data servers of the core network.

BACKGROUND OF THE INVENTION

A possible system and method to allow non-3GPP devices to connect to a 4G/5G core network is by using Hotspot 2.0 (a.k.a. Wi-Fi Certified Passpoint) as defined in the Hotspot 2.0 Technical Specification [HOTSPOT], allowing an operator to equip devices with e.g. X.509 certificates. However, many devices may be not operator controlled, and it is not clear how other basic Wi-Fi only devices at people's homes can be allowed access to the 4G/5G core network.

Document U.S. Pat. No. 9,648,019B2 describes Wi-Fi integration for non-SIM devices. The proposed system allows non-3GPP devices to connect to a 4G/5G core network. An Application Server (AS) can be used for enabling a non-Subscriber Identity Module (non-SIM) device to access a first network (e.g. mobile or 3GPP network) via a second network (e.g. Wi-Fi), where the non-SIM device is associated with a SIM device and where the AS receives, from the SIM device, information about the SIM device and its associated non-SIM device. The association between the SIM device and the non-SIM device is created by the AS based on the information received from the SIM device. The association between non-SIM device and SIM device is stored in a subscriber database.

Subsequently, to access the first network via the second network, based on a request for authorization to the first network from the non-SIM device, the system obtains the identity associated with the non-SIM device and transmits a request for a user profile associated with a user of the non-SIM device to the subscriber database, which request comprises the obtained identity for the non-SIM device. Then, the system receives, from the Subscriber database, the requested user profile for the non-SIM device, the requested user profile for the non-SIM device being associated with a SIM device. Based on the received user profile, the system authorizes the non-SIM device to access the first network via the second network. So, after the association between non-SIM device and SIM device has been established and stored in the subscriber data base, the non-SIM device may gain authorization to access the first network when it wants to access the first network.

In U.S. Pat. No. 9,648,019B2, the description of FIG. 1*b* may correspond to document [TS 23.402] of 3GPP, especially for the non-roaming case according to FIG. 4.2.2-1 and FIG. 4.2.2-2 and the description of the nodes and links shown in these figures and how to use these nodes and links in e.g. Clause 7 of [TS 23.402]. FIG. 4.2.3-1 to FIG. 4.2.3-5 of [TS 23.402] show the roaming case. The non-SIM device can access the first network through the node "Trusted Non-3GPP IP Access" or the node "Untrusted Non-3GPP IP Access".

SUMMARY OF THE INVENTION

In U.S. Pat. No. 9,648,019B2 it is not explained how the SIM device reliably obtains the identity of the non-SIM device or how the SIM device can obtain trust in an obtained identity. Lack of trust may open up the way for attackers to gain access for their devices to the mobile or 3GPP network by [mis-]using the SIM device. Also, after the association between the non-SIM device and the SIM device has been established, the non-SIM device can operate independently from the SIM device. Since the non-SIM device may be more vulnerable to hacking, the credentials that enable the non-SIM device to connect to the core cellular network could be stolen, after which a hacker could use this information to gain access the core network and charge the subscription of the SIM device's user.

It is an object of the invention to provide a system for reliably setting up wireless access to a core network for a non-SI device.

For this purpose, devices and methods are provided as defined in the appended claims. According to an aspect of the invention a non-SI device is provided as defined in claim 1. According to a further aspect of the invention there is provided a SI device as defined in claim 9. According to a further aspect of the invention there are provided methods as defined in claims 14 and 15. According to a further aspect of the invention there is provided a computer program product downloadable from a network and/or stored on a computer-readable medium and/or microprocessor-executable medium, the product comprising program code instructions for implementing the above method when executed on a computer.

The above non-SI device is arranged for wireless communication in a local network according to a local communication protocol. The local communication protocol defines protocol messages and wireless transceiving across a limited area. A subscriber identity, SI, comprises subscriber identity data of a subscriber to access a core network, the core network providing wireless communication for mobile devices across at least a regional area. The non-SI device does not comprise the SI and is arranged for cooperating with an SI device having access to the SI. The non-SI device comprises a transceiver arranged for local transceiving according to the local communication protocol and a processor arranged to execute an association sequence to establish an association with the SI. The association sequence comprises storing a non-SI private key constituting a pair with a non-SI public key, providing the non-SI public key to the SI device via a first communication channel, and sharing a verification code with the SI device via a second communication channel for verifying that the SI device has obtained the non-SI public key. The first and second communication channel are different and comprise as one channel an out-of-band, OOB, channel. The association sequence further comprises providing proof of possession of the non-SI private key to the SI device via the first or the second communication channel, and subsequently receiving, from the SI device, security data.

The security data comprises data related to the SI, usually called credentials. The security data is generated on behalf of the provider using the non-SI public key. In this context, the security data constitutes validated proof that the owner of the security data has rights to use the core network based on credentials related to the SI.

The security data may, for example, include a traditional signature over at least part of the non-SI public key, as generated by the CA, and includes credentials related to the SI which may, at least partly, be encrypted using the non-SI public key. For example, the credentials may be a username/password combination or just a password, while at least the password is encrypted and the username may remain unencrypted. The non-SI device may verify the security data, e.g. by verifying that the signature originates from the CA or by decrypting encrypted credentials with the non-SI private key.

The credentials may have been generated earlier via an application server, the CA and/or a subscriber database, and may be stored in e.g. the subscriber database. To constitute the security data, the credentials may be retrieved by the CA and at least partly encrypted with the non-SI public key before they are sent to the SI device. The credentials enable the non SI device to access the core network via the local network and a gateway between the local network and the core network. The encrypted credentials constitute security data and provide security, since the non-SI device is the only device knowing the non-SI private key. So, the non-SI device is the only device that can use the security data, and decrypt credentials, to access the core network. Furthermore, encrypting at least some credentials with the non-SI public key does not preclude the use of further keys for encrypting credentials.

After verifying the security data, the credentials, after decryption of the encrypted parts, enable the non-SI device to access the core network via the local network and a gateway between the local network and the core network.

The above association sequence may also be implemented in a method for use in a non-SI device, e.g. in software in a so-called app.

The above SI device is arranged for wireless communication with the above non-SI device. The SI device has access to the subscriber identity data, for example because the device contains or can be coupled to a SIM, or is arranged to access, via a network, a server containing the SI. The SI device comprises a transceiver arranged for wireless communication with the non-SI device, and a processor arranged to execute an association sequence to establish an association with the SI. The association sequence in the SI device comprises receiving a non-SI public key from the non-SI device via the first communication channel, and sharing a verification code with the non-SI device via the second communication channel. The association sequence in the SI device further comprises receiving, via the first or the second communication channel, proof of possession of a non-SI private key that constitutes a pair with the non-SI public key from the non-SI device. Upon successful evaluation of the received proof, the association sequence continues by obtaining the above security data, and transmitting the security data to the non-SI device. This association sequence may also be implemented in a method for use in an SI device.

The above features have the following effects. In the non-SI device, the non-SI private key must be available for use during executing the association sequence based on the paired non-SI public key. So, the processor may access a memory where the key is already stored, or may first generate or otherwise obtain a key pair, while the non-SI private key is subsequently stored for use during the association sequence.

The non-SI public key is transferred to the SI device via a first communication channel, while the verification code is shared with the SI device via a second, different, communication channel for verifying that the SI device has obtained the non-SI public key. So, the non-SI device is arranged to establish said first and second communication channels to the SI device, which channels include one OOB-channel and are both set up independently. In this context, a communication channel is a data link via a physical mechanism such as radio transmission or visual information that is displayed and scanned or codes read and compared by a user or a code read and manually entered by a user or manually entered codes in both devices. Each channel transfers data between the end points of the channel, in this case the non-SI device and the SI-system. One channel may, for example, be a wireless channel created via the local communication network by exchanging protocol messages between the non-SI device and the SI device. Another example is a wireless channel not using the local communication network but some other wireless communication protocol like Bluetooth or a separate Wi-Fi network. The other channel is an out of band, OOB, channel, with respect the said one wireless channel using some frequency band for radio transmission. So, the OOB channel is using a different physical mechanism than said one wireless channel, e.g. visual or manually entering data by a user. At least one of the channels is created via physical mechanism having a limited range so as to enable a user to verify that the non-SI device intended to be integrated is within that limited range from the SI device that constitutes the physical end point of the respective channel. Various examples are provided later.

Applying two different communication channels, one of the channels being an OOB channel, has the advantage to reliably assure that the non-SI device is within a limited range, i.e. within the communication range of both the first and second communication channels. Using the OOB channel advantageously avoids that a malicious intermediate party detects all wireless communication, and manipulates that communication, to obtain or change access rights and/or the user data traffic, a so-called man-in-the-middle attack. Also, the OOB channel may require user interaction involving the non-SI device, which advantageously provides confirmation to the user that the intended non-SI device is actually being coupled to the user's subscriber identity, SI, e.g. for using the subscribers credit or voice/data bundle.

The verification code enables the non-SI device to verify that the SI device has obtained the non-SI public key, as intended. Effectively, the verification code represents proof that the sender actually is coupled to, or in communication with, the intended non-SI device according to a predefined protocol. There are many variants for sharing such a code via a communication channel operating according to such a protocol. The word "sharing" as used in this context covers any way to transfer the verification code over a communication channel between the non-SI device and the SI device. For example, the non-SI public key is sent over a wireless channel that is an OOB channel, e.g. Bluetooth or NFC which in this context is OOB because it uses a different transmission band than the other communication channel. The verification code is sent back over the second wireless channel, e.g. via Wi-Fi. Alternatively, the non-SI public key may be transferred via a wireless channel and the verification code as generated by the non-SI device is transferred via an OOB channel involving the user. For example, the verification code is communicated to the user, e.g. via a display or audio signal, while the user has to enter the same code to the SI device, e.g. via a keyboard. Or, vice versa, a code may be displayed at the SI device to be entered at the non-SI device. Also, the verification code may be displayed by both the non-SI device and the SI device, while a confirmation must be entered on one or both sides, e.g. by pushing a button or clicking an icon. Also, the verification code may be a code that the user knows or has to generate, which must subsequently be entered at both sides.

The verification code may be a hash of the non-SI public key as obtained by the SI device. The verification code also may be, or include, the non-SI public key itself. It may also be any numerical code, password or passphrase generated by one of the devices or the user. A first example defines proof that the sender has obtained the correct non-SI public key according to the protocol. For example, the non-SI public key may be obtained by the SI device by scanning a QR code. Such scanning constitutes an OOB channel (in this case a one-way communication channel) and the SI device sends, as the verification code, the non-SI public key itself, and/or a hash of it, to the non-SI device over Wi-Fi (the other communication channel). So, the non-SI device knows that the device communicating with it over Wi-Fi has just scanned its non-SI public key. Alternatively, the non-SI public key may be transferred via Wi-Fi, while the verification code is transferred back from the SI device to the non-SI device using the OOB channel (e.g. by manually entering the code), which gives the same assurance to the non-SI device via this one-way communication channel.

The proof of possession of the non-SI private key is transferred to the SI device, e.g. via the local communication network, the first or second communication channel, or a further network. Proof of possession of a private key to a party may be done by encrypting data from that party with the private key. The other party can check the result by decryption of the encrypted data with the corresponding public key and checking whether the result is the same as the data provided. The other party can also encrypt something with the public key of the device that has to prove possession of the private key, send the encrypted result and ask the device to prove possession of the private key by decrypting it and returning the result. Proof of possession of a private key is also done when devices set up a secure channel by exchanging one or more public keys, as is done in e.g. the SSL, TLS and the DPP Authentication protocol. This way the non-SI device and the SI device can set up a secure channel over networks like Wi-Fi, Bluetooth or the local network, based on the non-SI public key. The proof of possession reliably assures to the SI device that the non-SI device actually is the owner of the non-SI key pair.

The security data represent at least part of the credentials required to use the core network and identify the user to the provider of the core network. In the core networks as managed according to the 3GPP, the credentials may be called 3GPP credentials. The security data is issued on behalf of the provider, e.g. generated on a provider server or application server, and comprises at least some credentials related to the SI that are encrypted using the non-SI public key. Optionally, the certification authority CA may generate a signature which represent its authorization, in this context authorizing the rights to use the core network while being associated to the SI of a known subscriber to the core network. For example, the security data may comprise a signature as generated by the CA over at least part of the non-SI public key and/or over part of the encrypted and non-encrypted credentials. The security data may contain further core network data, like a core identity code, a device code like IMEI (International Mobile Equipment Identity), or a subscriber identity code like IMSI (International Mobile Subscriber Identity). Also, the security data may contain other information, like a subscriber name, the owner of the public and associated private key, his address, etc. The security data may be transferred to the non-SI device using the secure channel as already established via the local network.

When receiving the security data, the non-SI device may check the security data. For example, it may check the signature in the security data using a public verification key of the CA, while using at least a part of the non-SI public key in the security data and/or its own copy of the non-SI public key. Credentials, or further core network data may, at least partly, be encrypted, e.g. using the non-SI public key, while the non-SI device may verify the security data by decrypting while using the non-SI private key.

The security data, upon decryption of any encrypted parts, enables the non-SI device to access the core network via the local network and a gateway between the local network and the core network. In practice, the non-SI device may use various gateways in different locations to communicate through the core network. The gateway translates the protocol and messages at the local network side, e.g. Wi-Fi, to corresponding messages at the core network side according to the core communication protocol.

When a device uses the security data to get authorized for access, the core network may try to authenticate the device on various aspects. For example, the core network may check the signature of the security data to see whether it is signed correctly, and by checking that the security data is signed by the CA. Furthermore, the core network may require the device to prove that it possesses the non-SI private key corresponding to the non-SI public key. If the signature is correct, or upon receiving and successfully verifying said proof, the core network will use identity data as provided by the non-SI device, such as the non-SI public key or part of the further core network data, to search in a subscriber database to see whether this identity has the right to access the network. For example, when the for the SI a subscription has been paid, due to the association between the non-SI device and the SI, the use of the core network by the non-SI device may be billed to the subscriber. The association data defining the link between the non-SI device and the subscriber is stored in a database of the core network.

When a device uses credentials, e.g. a username/password combination, or an identity and a secret key, to get authorized for access, the core network tries to authenticate the device by checking whether the supplied username/password combination is known to the network and correct. The password may be sent in the clear to the network for this purpose, but a hash over the password concatenated before hashing with other information like a network supplied nonce, may also be sent to the network. In case the credentials comprise an identity and a secret key, the network asks the device to supply its identity and perform a computation with the secret key and send the result to the network, which result can then be checked for correctness by the network. If the authentication was performed successfully, the core network will use username or identity data as provided by the non-SI device, to search in a subscriber database to see whether this identity has the right to access the network.

In an embodiment, the association sequence comprises providing a secure channel as the other channel of the first and second communication channel by engaging
- a secure socket layer, SSL [RFC 6101], protocol or a transport layer security, TLS [RFC 5246], protocol with the non-SI device acting as server, where the non-SI device provides the non-SI public key in a self-signed certificate and uses this certificate as a server certificate in a server certificate message; or
- an SSL or TLS protocol as with the non-SI device acting client, where the non-SI device provides the non-SI public key in a self-signed certificate in a client-authenticated handshake; or
- an internet protocol security, IPsec [RFC 4301], tunnel set up by public key encryption in which the non-SI public key or non-SI private key is used; or
- a device provisioning protocol, DPP [DPP], Authentication protocol, where the non-SI device provides the non-SI public key or a further non-SI public key as DPP bootstrapping key or as DPP protocol key. Effectively, the secure channel is provided between the non-SI device and the SI device, while the other channel between both devices is an OOB channel. Advantageously, the different, independent channels provide security to the user that the non-SI device is the device intended to be associated. By setting up the secure channel in the above-mentioned ways or using other protocols, the non-SI device has also proven possession of the non-SI private key to the SI device.

In an embodiment, said receiving the security data comprises receiving the security data via the secure channel. Advantageously, the security data, including any credentials, is controllably and securely delivered to the non-SI device, which is the device intended to be associated.

In an embodiment, the OOB channel is provided via one of the group
- a short range radio communication protocol like NFC or Bluetooth,
- a visual channel using a visual code like a barcode or a QR code at the non-SI device side and a scanner or camera at the SI device side,
- a user channel where a code is displayed at the SI device side and is to be entered at the non-SI-system side,
- a user channel where a code is displayed at the non-SI device side and is to be entered at the SI-system side, or is to be compared to a further code at the SI-device side, and
- a user channel where a code is to be entered in the non-SI device and a related code is to be entered in the SI device. The various options for the OOB channel are effectively different and independent from the above secure channel via a local network.

In an embodiment, the security data comprises credentials related to the SI, at least part of the credentials being encrypted using the non-SI public key.

In an embodiment, the non-SI public key comprises a first non-SI public key and a second non-SI public key, respectively corresponding to a first non-SI private key and a second non-SI private key,
the first non-SI public key being initially provided to the SI device via the OOB channel, and the second non-SI public key being subsequently used for said generating the security data. Advantageously, the second non-SI public key is unique for use as the identity and/or encryption key in the security data, while the first non-SI public key may be freely distributed or may be fixed, because it is printed on e.g. the housing or manual of the device.

In an embodiment, the processor in the non-SI device is further arranged for
receiving heart beat messages from the SI device, the SI device transferring the heart beat messages upon receiving the heart beat messages from the core network, and transferring the heart beat messages to the core network via the gateway; or
receiving heart beat messages from the core network via the gateway and transferring the heart beat messages to the SI device, the SI device transferring the heart beat messages to the core network;
for enabling the core network to disable the access of the non-SI device to the core network upon, during a predetermined interval, not receiving the heart beat messages from the non-SI device. Advantageously, the heart beat messages provide proof that the SI device consents in the use of the SI by the non-SI device.

In an embodiment, the processor in the non-SI device is further arranged for managing a multitude of user accounts, and for
selectively for respective user accounts executing the association sequence to establish multiple respective instances of security data, and
selectively for a respective user account enabling the non-SI device to access the core network based on the respective instance of security data. Advantageously, multiple associations may be provided for respective user accounts.

The methods according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc.

The computer program product in a non-transient form may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is also provided a computer program product in a transient form downloadable from a network and/or stored in a volatile computer-readable memory and/or microprocessor-executable medium, the product comprising program code instructions for implementing a method as described above when executed on a computer.

Another aspect of the invention provides a method of making the computer program in a transient form available for downloading. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
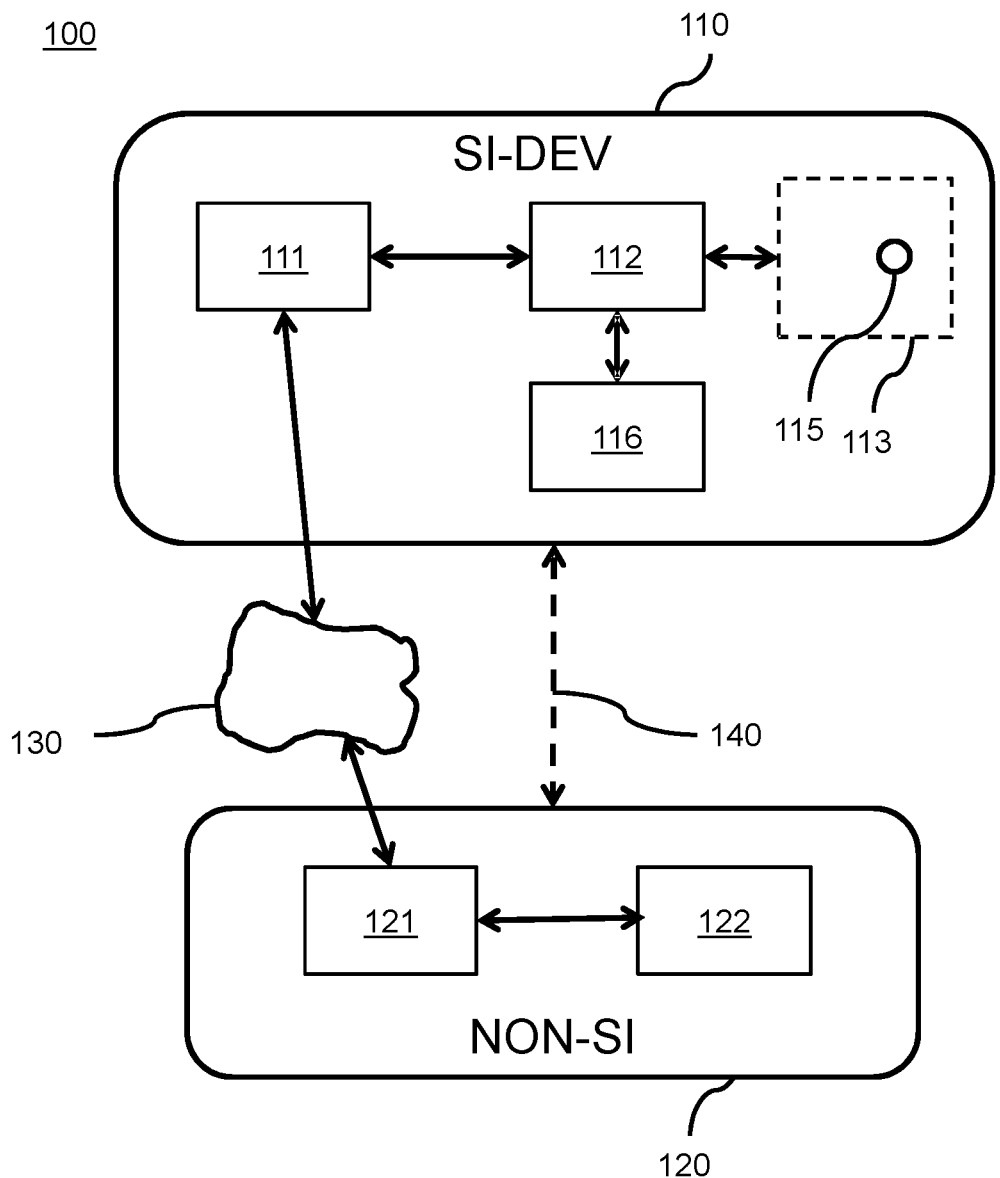
FIG. 1 shows a non-SI device and an SI device for wireless communication and establishing an OOB communication channel.

FIG. 1 shows a non-SI device and an SI device for wireless communication and establishing an OOB communication channel. In a communication system 100, a non-subscriber-identity, non-SI, device 120 is arranged for wireless communication in a local network according to a local communication protocol. The local communication protocol, e.g. Wi-Fi, defines protocol messages and wireless transceiving across a limited area, the area being limited to the radio transmission range of the Wi-Fi transceivers.

In such a communication system, further called an SI system, a subscriber identity, SI, comprises subscriber identity data of a subscriber to access a core network, the core network providing wireless communication for mobile devices across at least a regional area. As elucidated in the introduction, the core network may be a 3G, LTE, 4G or 5G cellular core network having extensions as proposed by 3GPP to allow a non-SI device to access the core cellular network using a local network, such as Wi-Fi, to access, e.g., a 4G core network called Evolved Packet Core or EPC.

FIG. 1 schematically shows wireless communication 130 for providing a communication channel between the non-SI device 120 and the SI device 110. Such an SI system has at least one local communication network wireless for communication across a limited area and at least one core network wireless communication for mobile devices across at least a regional area. The core network is managed by at least one provider, e.g. for managing a subscriber database and invoicing. The SI system may include any combination of the following elements:
- at least one subscriber identity module, SIM, comprising the subscriber identity data; or
- at least one SIM device comprising a SIM and a transceiver arranged for communicating with the core network;
- an application server, AS, arranged for enabling the association sequence at the provider side; or
- a subscriber database for storing, at the provider side, subscriber data regarding using the core network; or
- a certification authority, CA, arranged for authorizing the subscriber credentials; or
- a user server arranged for, based on user credentials, accessing and providing the subscriber identity data and subscriber credentials via the internet, etc.

The non-SI device 120 initially does not have the SI and is arranged for cooperating with an SI device 110 having access to the SI. The non-SI device has a transceiver 121 arranged for local transceiving according to the local communication protocol, and a processor 122 arranged to execute an association sequence to establish an association with the SI.

The processor 122 is arranged to provide a wireless channel to the SI device, for example via the local network. However, the wireless channel may also be provided via a different communication system, e.g. a further Wi-Fi link or a Bluetooth system. The processor 122 is arranged to provide, as a further communication channel, an out-of-band, OOB channel 140 to the SI device, as indicated by the dashed arrow. As elucidated in the introduction, the OOB channel is out of band with respect to the above wireless channel using some frequency band for radio transmission. So, the OOB channel is using a different physical mechanism than said one wireless channel, e.g. visual or manually entering data by a user. At least one of the channels is created via physical mechanism having a limited range so as to enable a user to verify that the non-SI device intended to be associated is within that limited range from the SI device that constitutes the physical end point of the respective channel.

The SI device 110 is arranged for wireless communication with the above non-SI device. The SI device has a transceiver 111 arranged for wireless communication with the non-SI device, and a processor 112 arranged to execute an association sequence to establish an association with the SI. The SI device may be provided with a subscriber identity module, SIM, 116. The SI device may also be provided with a user interface 113, e.g. including a display and one or more user input elements 115. For example, the user input elements may comprise one or more of a touch screen, various buttons, a mouse or touch pad, etc. Buttons may be traditional physical buttons, touch sensors, or virtual buttons, e.g. on a touch screen or icons to be activated via a mouse. The user interface may also be a remote user interface.

The processor 112 is arranged to provide a wireless channel to the non-SI device, for example via the local network. However, the wireless channel may also be provided via a different communication system, e.g. a further Wi-Fi link or a Bluetooth system. The processor is arranged to provide, as a further communication channel, an out-of-band, OOB channel 140 to the SI device, as indicated by the dashed arrow. So, the first and second communication are different and include as one channel the OOB channel. The non-SI device comprises a non-SI private key, for example stored in a memory. The non-SI private key constitutes a key pair with a non-SI public key.

In the non-SI device, the association sequence includes providing the non-SI public key to the SI device via a first communication channel. Next, a verification code is shared with the SI device via a second communication channel. Then, proof of possession of the non-SI private key is provided to the SI device via the first or the second communication channel. Next, from the SI device, security data is to be received that relates to the SI. The security data includes credentials and may have some signature as generated by a certification authority using the non-SI public key, as elucidated above. The credentials, after decrypting any encrypted parts, enable the non-SI device to access the core network via the local network and a gateway (shown in FIG. 2) between the local network and the core network.

In the SI device, the processor 112 is arranged to execute the association sequence that includes receiving a non-SI public key from the non-SI device via the first communication channel. Next, a verification code is shared with the non-SI device via the second communication channel. Then via the first or the second communication channel, proof of possession of a non-SI private key is received that constitutes a pair with the non-SI public key from the non-SI device. Upon successful evaluation of the received proof, the security data is obtained that relates to the SI, as elucidated above. Finally, the security data is transmitted to the non-SI device.

Regarding the use of public and private keys, e.g. using an OOB channel, the following is noted. When two wireless devices need to secure their communication, they usually encrypt their communication. However, this requires that both wireless devices know the same key.

Diffie-Hellman, see reference document [DH], is a well-known technique for establishing a secret key between two parties, where the communication between the parties for establishing the secret key does not reveal any information to third parties on the established secret key. The two parties each use their own public/private key pair and exchange the public key with each other. Each party is able to compute the secret key using its own private key and the other party's public key and possibly some other information, e.g. a nonce (random number) from each party. Each party may generate a key pair anew each time it performs Diffie-Hellman or it reuses an older key pair.

The Device Provisioning Protocol (DPP) of the Wi-Fi Alliance, see reference document [DPP], uses Diffie-Hellman to establish a secret key between two devices, a DPP Enrollee that wants to be configured and a DPP Configurator that is able to configure DPP Enrollees, so these can get access to a DPP enabled network, see also the reference document [802.11].

When performing Diffie-Hellman over a network, a device that receives a public key for performing Diffie-Hellman does not know from which device this public key is. This may be exploited by an attacker in a so-called man-in-the-middle attack. An attacker E might masquerade as the real device B with which device A wants to connect. The attacker E performs Diffie-Hellman with device A and establishes a secret key with device A. Similarly, the attacker masquerades as device A to device B and establishes a secret key with device B. When a message comes in from one of the devices A or B, the attacker decrypts the message with the one secret key, encrypts it with the other and forwards it to the other device. This way, the devices A and B do not notice anything strange in their communication, except for some extra delay. When they check their communication by sending the same information using another way of communication and comparing the results, they will not notice any tampering with their communication. But the attacker has complete knowledge on what they communicate.

To prevent man-in-the-middle attacks it is proposed to use an additional shortrange communication protocol, the Out-Of-Band (OOB) channel, for exchanging the public keys, or verification codes such as hashes of the public keys. For example, the user of a device knows that the public key received OOB is from a device within the operating range of the shortrange communication protocol. In the case the hash of public keys is exchanged OOB, the device can check whether the public key received via the first communication channel, e.g. Wi-Fi, that needs to be encrypted leads to the same hash as the hash received OOB. Note that the use of the term communication protocol in this document encompasses multiple layers of the ISO-OSI model, including the physical layer for transceiving.

In [DPP], several OOB methods are described, one of which is Near Field Communication (NFC). NFC is a technique of communication wirelessly over a relatively short distance, say 10-20 cm. NFC may, for example, be used as OOB communication for exchanging public keys. When using NFC, the user knows that the public key received over NFC came from a device within 10-20 cm from his device, so the device with which he performed an NFC "touch". When using NFC in peer-to-peer-mode, the other device also can be sure that it received a public key from the user's device.

Figure 2:
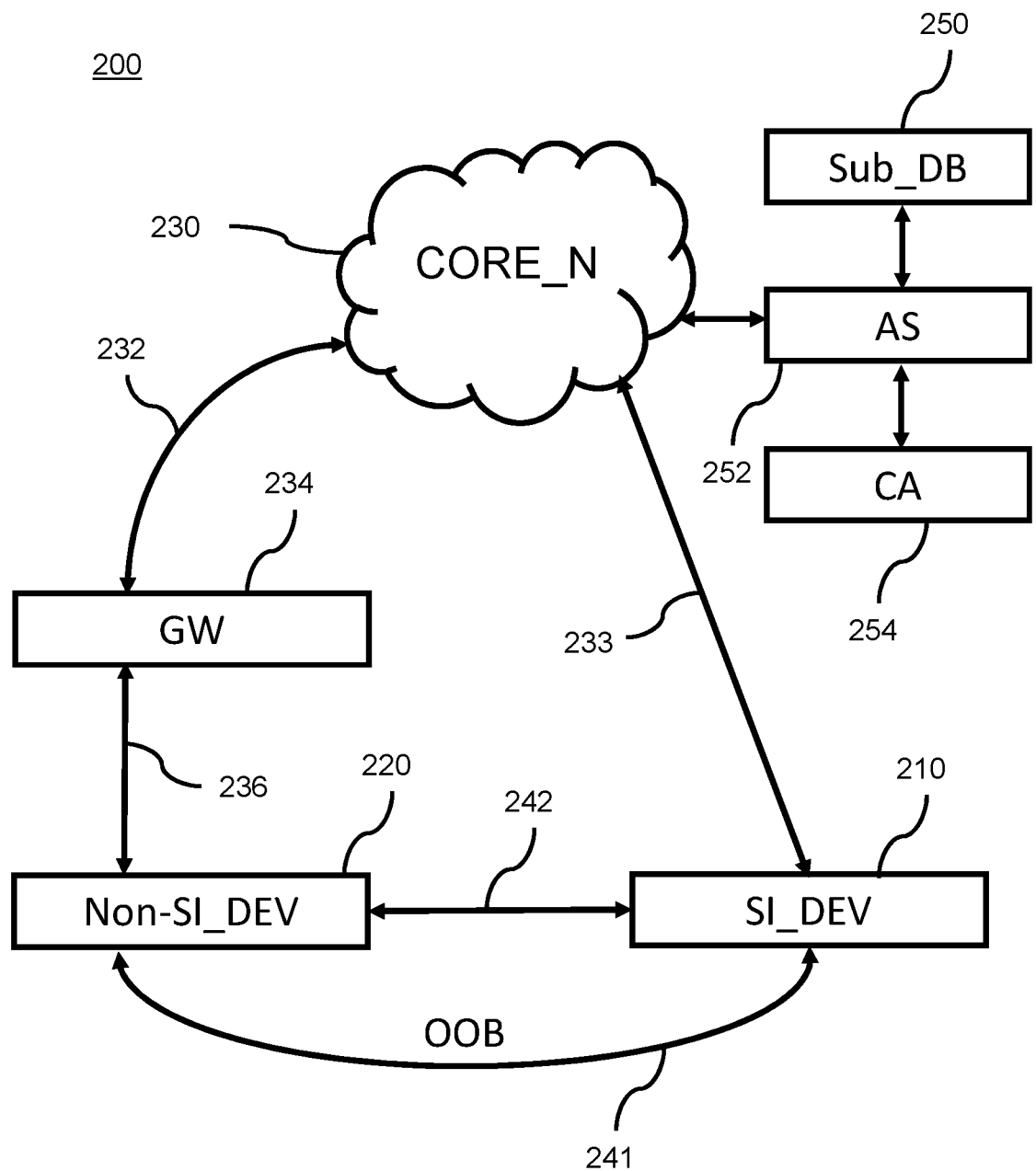
FIG. 2 shows a non-SI device and an SI device for wireless communication.

FIG. 2 shows a non-SI device and an SI device for wireless communication via a core network. In a communication system 200, a non-SI device 220 is arranged wireless communication in a local network 236 according to a local communication protocol, e.g. Wi-Fi.

In the communication system, the core network CORE N 230 provides wireless communication 232, 233 for mobile or stationary devices across at least a regional area. As elucidated in the introduction, the core network may be a 3GPP Evolved Packet Core or EPC. The communication system may further include a gateway GW 234 between the local network 236 and the core network. Also, the core network may be coupled to an application server AS 252, a subscriber database Sub_DB 250 and a certification authority CA 254. The SI data may be available at locations like a management system of the provider of the core network, e.g. in the subscriber database 250 on a server managing the subscriber identity data. Subscriber credentials may be authenticated and authorized using the authorization server or certificate authority 254. For example, the SI data may be also accessed by the subscriber by logging in to a user account on the application server 252, via the internet using user credentials like a user name and password or using a two-factor authorization. The AS may be coupled to, or may comprise, the subscriber database and the CA. The AS may control the process of associating a non-SI device to an SI.

The SI device may be a SIM device arranged for communicating 233 via the core network to one or more servers that store a subscriber database and the CA, while also being arranged to communicate via a wireless channel 242 to the non-SI device, in particular a secure channel.

In an embodiment, the association sequence comprises providing a secure channel as the other channel of the first and second communication channel by engaging a secure socket layer, SSL [RFC 6101], protocol or a transport layer security, TLS [RFC 5246], protocol with the non-SI device acting as server, where the non-SI device provides the non-SI public key in a self-signed certificate and uses this certificate as a server certificate in a server certificate message. Alternatively, the secure channel may be provided by engaging an SSL or TLS protocol as with the non-SI device acting client, where the non-SI device provides the non-SI public key in a self-signed certificate in a client-authenticated handshake. Alternatively, the secure channel may be provided by engaging an internet protocol security, IPsec [RFC 4301], tunnel set up by public key encryption in which the non-SI public key or non-SI private key is used. Alternatively, the secure channel may be provided by engaging a device provisioning protocol, DPP [DPP], Authentication protocol, where the non-SI device provides the non-SI public key or a further non-SI public key as DPP bootstrapping key or as DPP protocol key. Optionally, in the association sequence, after providing one of the above secure channels, the security data is also transferred via the secure channel.

When only using the above SSL, TLS, or IPsec, the SI device has no proof that it is communicating with the non-SI device when proving possession of the private key. By obtaining the bootstrapping key of the non-SI device in an Out-Of-Band (OOB) manner, the SI device has proof that it is communicating with the non-SI device when the non-SI device proves possession of the corresponding private key, especially when the bootstrapping key pair has been generated just prior to using the OOB communication and a short-range communication technology is used for the OOB communication. The bootstrapping key of the non-SI device can be used as the first public key above, or another public key, the protocol key, can be used as the first public key. The DPP specification provides examples of how a device may transfer the protocol key over a wireless network and how that device proves possession of the private key that corresponds with the protocol key.

Likewise, an OOB channel can be used between the non-SI and SI device before they engage in an SSL or TTL or IPsec protocol session, where the first public key, a certificate containing the first public key or a hash of the public key or certificate is communicated OOB to the SI device. The SI device has to check whether the information about the first public key that it obtained OOB corresponds with the first public key that it obtained from the non-SI device through the secure channel. The SI device, as an option, can also make the public key it uses for setting up the secure channel, a certificate containing its public key or a hash of its public key or certificate available to the non-SI device over the OOB protocol. Short-range communication protocols such as NFC, QR-code displaying and scanning, Bluetooth, etc. are suitable OOB protocols. An example of an OOB method that involves the user is where the non-SI device displays a (shortened) hash of its public key or certificate that the user has to compare to the (shortened) hash of the public key or certificate as received over the third network and displayed by the SI device.

Another example of an OOB method that involves the user is where the user enters a numerical code (e.g. a PIN code), password, or passphrase in both devices before they engage in the SSL or TTL or IPsec protocol session and where the devices have to check that the same verification is used. Another example of an OOB method that involves the user is where the user enters a numerical code (e.g. a PIN code), password, or passphrase as the PKEX (Public Key Exchange) 'code' in both devices before they engage in the DPP Authentication protocol session, where PKEX is used for bootstrapping the security of the DPP Authentication protocol, see [DPP] for PKEX and the PKEX 'code' (section 5.6) and the DPP Authentication protocol (section 6.2).

Also, as short range OOB secure channel, if the SI device and non-SI device are both securely connected to the same Wi-Fi Access Point or Residential Gateway, the Wi-Fi infrastructure connection can be used as OOB channel over which the non-SI device proves possession of the private key.

In another embodiment, the SI device may be a Wi-Fi Access Point and Residential Gateway (for example 5G-RG in [TR 23.716], connected to the 5G core network and supporting the 5G network protocols) equipped with a SIM and able to communicate with the non-SI device over the OOB channel over which the non-SI device provides an identity that is later on used in a Diffie-Hellman exchange for setting up a secure channel between the non-SI and SI device. This identity or another public key or certificate used in setting up the secure channel may then be used as the identity of the non-SI device for associating the non-SI device to a core cellular network. Also, some part of the identity or certificate may then be used as a public key to encrypt further credentials that are associated with the SI, which further credentials may subsequently be used by the non-SI device to become authorized to access the core network. The SI device may be operated through a remote UI on e.g. a smart phone. The secure channel may be any of the four options described above or any other secure channel.

In another embodiment, the SI device is a mobile device acting as a DPP configurator, see [DPP], for a 5G-RG, whereby the SI device has a user interface to let the user choose whether it wants to associate the non-SI device with the SI device or the 5G-RG or both. The device may show information of the subscriber database related to the SI device and the 5G-RG device, on the user profile or pricing/charging information related to the different options. In case the non-SI device is going to be associated with the SI device for access to the core network, the DPP protocol key or the DPP bootstrapping key of the non-SI device can be used as the identity of the non-SI device.

In the above options, the user/owner of the SI device may be asked to accept the association of the non-SI device with the SI device since this may involve added cost for the user/owner.

In practice, the association sequence may involve the following. After the SI device has successfully obtained proof of the identity of the non-SI device, the SI device uses the first public key or a certificate generated by the non-SI device that contains the first public key as identity of the non-SI device and sends this to an AS server, e.g. through the 3GPP core network, either directly or through a Wi-Fi Access Point/Residential Gateway, which may or not be 5G enabled. The AS server creates a user profile for the non-SI device and an association between the SI of the SI device and the (user profile of the) non-SI device using the first public key as identity of the non-SI device. The AS sends this user profile of the non-SI device to a subscriber database that stores this user profile. The AS may request security data using a first public key from a certificate authority or certification authority server (CA) and may send the security data to the SI device, which subsequently sends this security data to the non-SI device, preferably over a secure channel such as the SSL, TLS connection, IPsec tunnel or using the symmetric key established during DPP Authentication, e.g. as part of a DPP Configuration protocol message in the DPP Configuration object or even in a DPP Connector. Besides the first public key, the request for security data to the CA may include other information to be included, such as information on the user profile, the IMEI (if any) to be used by the non-SI device, the IMSI (if any) to be used by the SI device, etc. Further examples of the concepts of the AS, CA and Sub_DB server, and how such servers may assist to create an association between the SIM and non-SIM device, are provided in U.S. Pat. No. 9,648,019B2, while now using the non-SI public key as identity and the secure channel between the SIM and non-SIM device. The AS may also request credentials from a CA, a provider server or subscriber database, the credentials enabling the non-SI device to become authorized for accessing the core network. These credentials are stored by the provider, e.g. in the subscriber database. The AS encrypts at least part of the credentials with the first public key and sends security data including the encrypted credentials to the SI device, which forwards the security data to the non-SI device for processing as described above.

Figure 3:
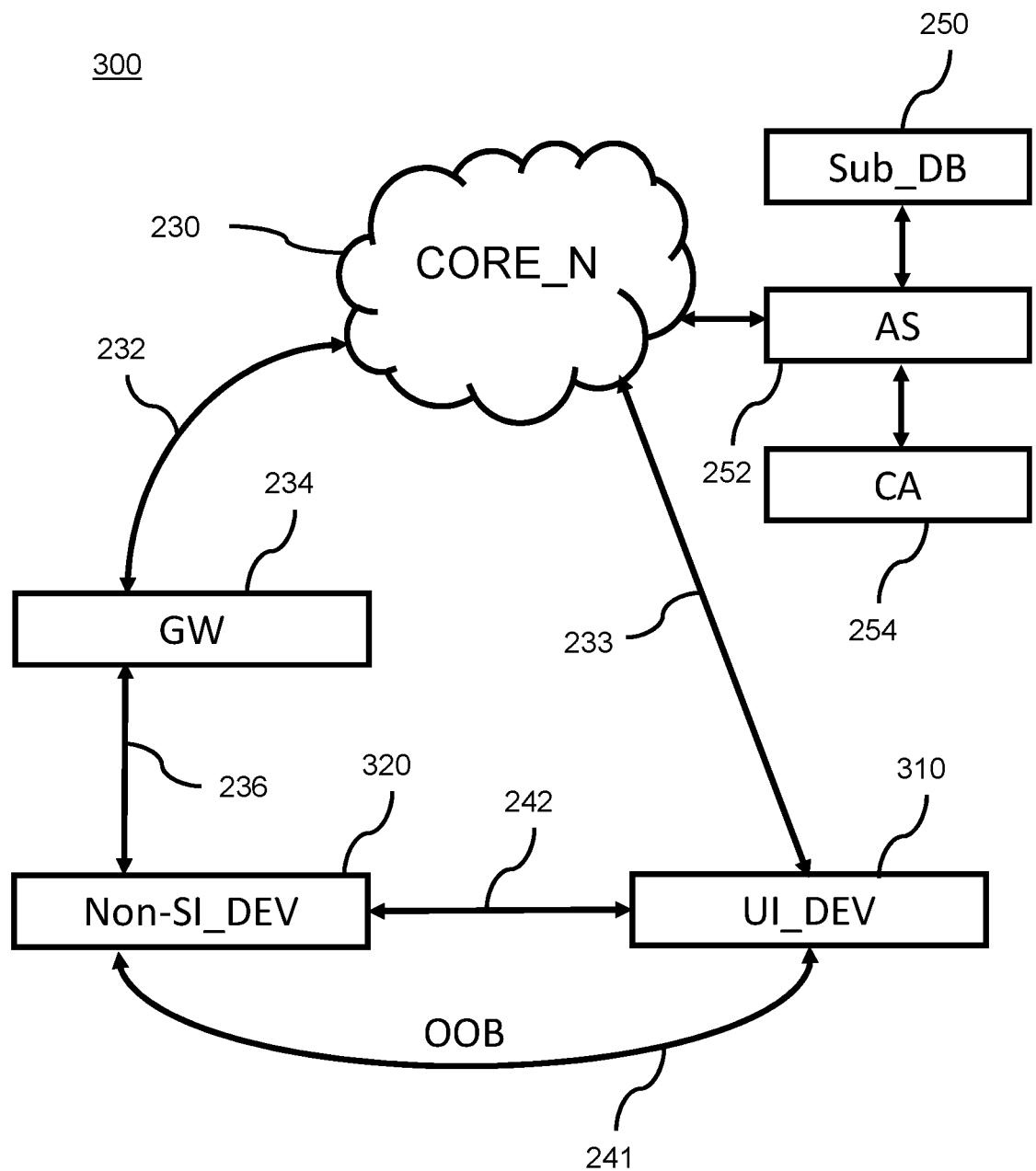
FIG. 3 shows a non-SI device and a UI device for wireless communication.

FIG. 3 shows a non-SI device and a UI device for wireless communication via a core network. In a communication system 300, a non-SI device 320 is arranged for wireless communication with the UI device 310, e.g. via Wi-Fi. Various elements of the communication system 300 correspond to similar elements in the communication system 200 described with reference to FIG. 2. Such elements have the same reference numerals and are not described again. The UI device 310 has a user interface and a transceiver to communicate via the core network for accessing the SI. Thereto the UI device is arranged for connecting to the AS 252 and obtaining the SI from the subscriber database Sub-DB 250 and the security data, e.g. from the CA 254.

In an embodiment, credentials for accessing a 3GPP core network may be linked to a person; a scenario may be the following. The owner of a (U-)SIM card also has an account on the web-site of his provider. When logging in on the web site of his provider, using any UI device with a 3GPP connection a 3GPP transceiver, a user may be able to request person-based credentials. Logging in to the web site of the provider may require any authentication procedure, e.g. username/password, a certificate, etc. The UI device may have to supply the public key to be used for generating the security data. It may also be that the credentials are delivered by the website include a corresponding private key. The website may store the credentials, and possibly the corresponding private key, at an appropriate place in the UI device and after that, the UI device can use the certificate to get authenticated on a 3GPP network through an AP or Residential Gateway that is connected to a 3GPP network. The owner of the (U-)SIM card is billed for the 3GPP use of the non-SI device. In the certificate, the UI device may also request and receive credentials that are encrypted with the public key, as explained previously.

The above may be implemented in a device that has a UI or that can run such an app. For a headless device, i.e. a device without a user interface, as the non-SI device 320, the following is proposed to install a 3GPP credentials. A series of steps would be as described for FIG. 2, while the UI device has the role of the SI device above, but where the UI device obtains the security data as described above for the UI device. The UI device may be a SIM device using the SIM to connect to the 3GPP network and the Application Server.

Figure 4:
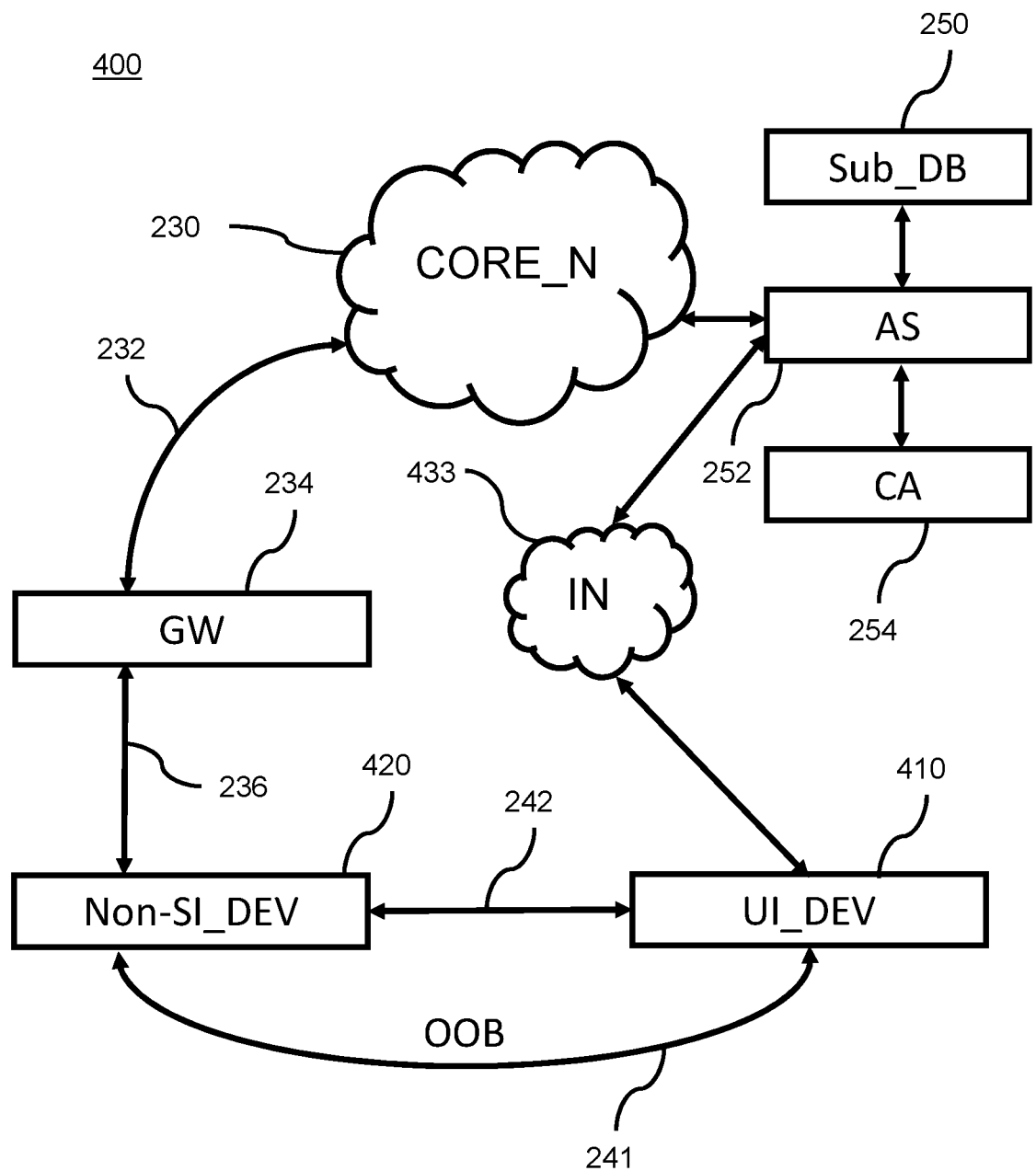
FIG. 4 shows a further example of a non-SI device and a UI device for wireless communication.

FIG. 4 shows a further example of a non-SI device and a UI device for wireless communication via a core network. In a communication system 400, a non-SI device 420 is arranged for wireless communication with the UI device 410, e.g. via Wi-Fi. Various elements of the communication system 400 correspond to similar elements in the communication system 200 described with reference to FIG. 2. Such elements have the same reference numerals and are not described again. The UI device 410 has a user interface and is arranged for communication via the internet IN 433. For example, the UI device 410 may connect to the application server AS 252 via the internet to obtain the security data, similar to obtaining the security data via a connection to the core network as described above with FIG. 3.

In an embodiment, the provider may provide an app that users can download and run on a device that has no 3GPP transceiver. The user has to enter his username and password in the app and the app then requests the security data over an Internet connection that does not involve the 3GPP cellular network. The app can then use the security data to get the non-SI device authenticated on a 3GPP network through an AP or Residential Gateway that is connected to a 3GPP network. In practice, the UI device may be a device having an Internet connection, e.g. through a land-line, where a trusted channel to the Application Server is set up where the user has to provide his username and password, or a certificate, etc.

In an embodiment, the non-SI device is a headless device that shows its public bootstrapping key on a sticker or in its manual in the form of a machine-readable code, e.g. a QR-code or a barcode. Headless devices with a good enough display may show a newly generated public bootstrapping key on their display. Next, the UI device scans the public bootstrapping key of the headless device. Next, the UI device sends the headless device information over Wi-Fi with which the headless device can know that the UI device has read its public bootstrapping key, e.g. by sending a hash of the public key.

Subsequently, to set up a secure channel, the UI device performs a Diffie-Hellman exchange over Wi-Fi with the headless device where it expects the headless device to use the public key bootstrapping key it has scanned and sets up a secure connection with the headless device this way. Optionally, the headless device creates a second non-SI public/private key pair, sends the second non-SI public key to the UI device and proves possession of the private key. This step may be integrated with the setting up of the secure channel.

Next, the UI device uses the public bootstrapping key, or the second non-SI public key as the public key to ask a for security data at the cellular network provider. This communication may be done over a further secure channel with a server of the cellular network provider that is set up using the user's credentials, e.g. username and password, for getting access to the user's account at the cellular network provider.

The UI device now receives security data including credentials from the cellular network provider, and transfers the security data to the non-SI device using said secure channel. The non-SI device can now use the second network (236) to get authenticated for the 3GPP network (232, 230) and use the 3GPP network.

Alternatively to the above security data based on the non-SI public key, the UI device may receive alternative security data based on a provider generated public key and also the accompanying provider generated private key and transfers both to the non-SI device. The non-SI device can now use the alternative security data based on the provider generated public key and the provider generated private key to use the 3GPP network.

In an embodiment, an operator or user may wish to limit the area in which the non-SI device, while being associated to the SI, can operate in order to get access to the core network, for example for additional safety. Various options are provided to determine whether the non-SI device is within the intended operational range, for example by making sure the two devices remain close to one another.

In an embodiment, the core network sends heart beat messages to the SI device over the first network, e.g. paging messages. The heart beat messages may have a random component, so that they are hard to predict by the non-SI device. The SI device is arranged to forward the heart beat messages to the non-SI device, e.g. using the secure channel set up for the association procedure between the non-SI device and the SI device. The non-SI device then forwards the received heart beats to the core network via the second network. The core network disables the access of the non-SI device to the core network when the core network has not received the correct heart beat signals for some time. The core network may enable access again after it has received the correct heart beat signals again.

Optionally, the heart beats may also be used by the SI device to limit the access of the non-SI device to the core network in time or use, since this access may involve added cost for the subscriber. When the SI device wants to limit access, it stops forwarding the heart beat signals. When the SI device allows access again, it starts forwarding the heart beat signals again. Another way to stop the access to the core network of the non-SI device is by the SI device revoking the associating of the first public key as an identity for an associated non-SI device at the AS server.

In another embodiment, the SI device regularly communicates information about the distance between the SI device and non-SI device to the AS using a stream of messages signed by the SI device. A distance may, for example, be determined by using the Timing measurement (TM) or fine timing measurement (FTM) mechanism as described in [802.11]. Alternatively, when the SI device is connected to a same Wi-Fi AP/Residential Gateway as the non-SI device, it may send information about such connections to the AS using a stream of messages signed by the SI device. The AS may be arranged to verify this information, and check that this information is properly signed by the SI device. If the distance is beyond a certain configured threshold, or if it has not recently received such connection information, the non-SI device is denied access to the core network.

In a further embodiment, the SI device acts as relay for a certain part of the traffic to and/or from the non-SI device. Thereto, the SI device is arranged to encrypt part of the messages using the SI device's own credentials. The AS can use the encrypted part to detect that the SI device is directly involved in the non-SI device communication and that the core network is not being accessed from a hacked non-SI device somewhere else attached to the core network.

In a further embodiment, the SI device and/or the AP/RG to which the non-SI device is connected may continuously keep track and send information about the services/content that are requested by the non-SI device to the AS. The AS may now check whether the services and content comply with access right assigned to the non-SI device. If not, a hacked device may be using the credentials of the non-SI device trying to access a different set of services/content as requested by the non-SI device. The AS may then revoke the access or services to the non-SI device.

In a further embodiment, the non-SI device may be set up with more than one user account. There is usually at least one primary user account with which other, secondary, accounts can be created. User accounts may be different from the user accounts of the SIM device, while users may have different rights to access content/services on the Internet or the cellular network (e.g. parent versus child). Each account may, for example, be connected with a different Google account or Apple ID or Microsoft account. Each secondary account may or may not have been given permission to use the Wi-Fi or 3GPP system of the device. Also, each account may need to be configured with different types of access restrictions for content/services offered by the cellular network (e.g. for parental control of under aged children accounts). Optionally, in a multi-user non-SI device, only particular user accounts may be allowed to be associated with a SI device. The association could be to the same SI for each of the allowed user accounts, in which case the association with the SI device only needs to be done once. Alternatively, multiple, different SI may be associated to respective user accounts, in which case the association needs to be done with each of the different SI separately.

In an embodiment, a user account name, or multiple user account names that are associated with one SI may have the account name or account ID listed in the credentials that the associated SI device requests from the CA server. To this end, the non-SI device needs to provide the user account name(s) to the SI device using the secure channel set up with the non-SI device during which the non-SI device proved possession of the private key belonging to the public key of the non-SI device. Optionally, the account name(s) are mentioned in a certificate containing a first public key and signed with the private key corresponding by the first public key (so e.g. in the self-signed SSL or TLS certificates generated by the non-SI device). Instead of just the first key, the SI device sends this certificate to the AS server and the security data to be generated by the CA server may contain the account name(s). The advantage to the user of the SI device is that he can see from the certificate which users of the non-SI device are enabled. The advantage to the SI device, AS and CA is that they can check that it has been the non-SI device that has named the user accounts.

In a further embodiment, when access of the non-SI device to the core network has been granted, information about the non-SI device's user accounts and possible access restrictions for which access is granted, is sent through the same secure channel through which the non-SI device proved possession of the private key belonging to the public key of the non-SI device. Upon receiving this information, the non-SI device enforces these access restrictions for the respective, different user accounts of the non-SI device.

Figure 5:
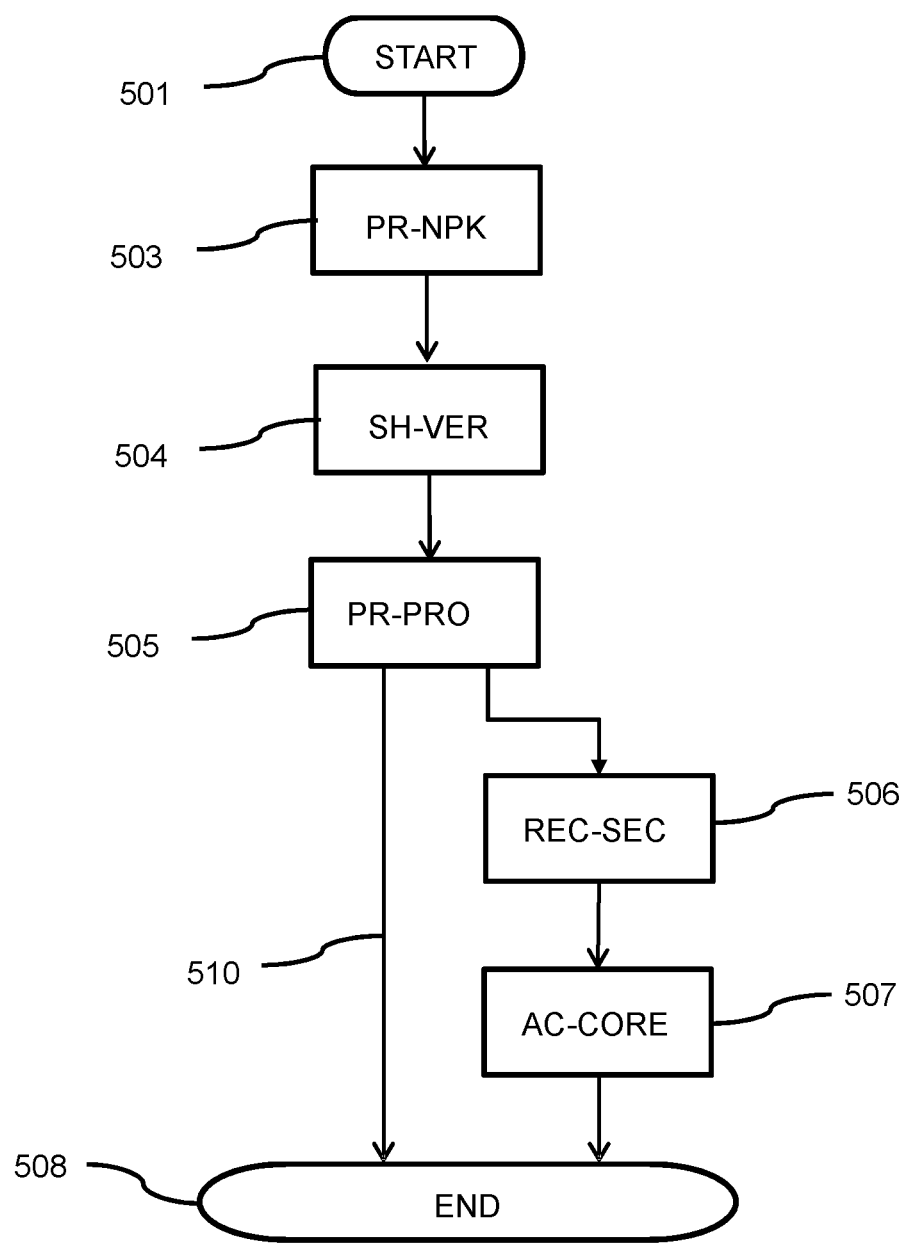
FIG. 5 shows a method for use in a non-SI device arranged for wireless communication with an SI device.

FIG. 5 shows a method for use in a non-SI device arranged for wireless communication with an SI device. The devices have been described above. The method may be executed, for example, by circuitry and software in a processor in a stationary or mobile computing device. The wireless communication in a local network, a core network or otherwise, and various options for an OOB channel, have been described above. It is noted that FIG. 5 shows a method for a non-SI device, which may be cooperating with the SI device. In the non-SI device a non-SI private key is stored which constitutes a pair with a non-SI public key. The key pair may be permanently or temporarily stored, or may be generated first for setting up a new association.

In the method, an association sequence is executed and starts at node START 501. In a first stage PR-NPK 503, the non-SI public key is provided to the SI device via a first communication channel. Thereto the first communication channel is set up, e.g. via a wireless network such as Wi-Fi. The first channel may also be an OOB channel as elucidated above, for example, the non-SI public key may be provided to the SI device in printed form, while the corresponding private key has to be stored internally in the non-SI device.

In a next stage SH-VER 504, a verification code is shared with the SI device via a second communication channel. Thereto the second communication channel is set up, e.g. via a wireless communication different from the first communication channel, e.g. Bluetooth. The first and second communication channel are different, while one of the first and second communication channel is an OOB channel. For example, the verification code may be shared via an OOB channel by displaying the code on the SI device, while the user has to enter the code manually on the non-SI device. In a next stage, PR-PRO 505, proof of possession, using any of the protocols for this mentioned before, of the non-SI private key is provided to the SI device via the first or the second communication channel.

If the evaluating of the proof is not successful, the method terminates as indicated by arrow 510 as no security data is received, e.g. after a predetermined timeout period, or when receiving a message that no security data is available. If the proof has been successfully evaluated, the SI device may obtain the security data including credentials, and send the security data to the non-SI device. In a next stage REC-SEC 506 security data is received from the SI device, which is related to the SI and may include a signature, e.g. a signature as generated by a certification authority over at least part of the non-SI public key, and includes credentials related to the SI, at least part of the credentials being encrypted using the non-SI public key.

Finally, in a stage AC-CORE 507, the security data, after decryption of the encrypted parts, enables the non-SI device to access the core network via the local network and a gateway between the local network and the core network. The association sequence is terminated in node END 508.

Figure 6:
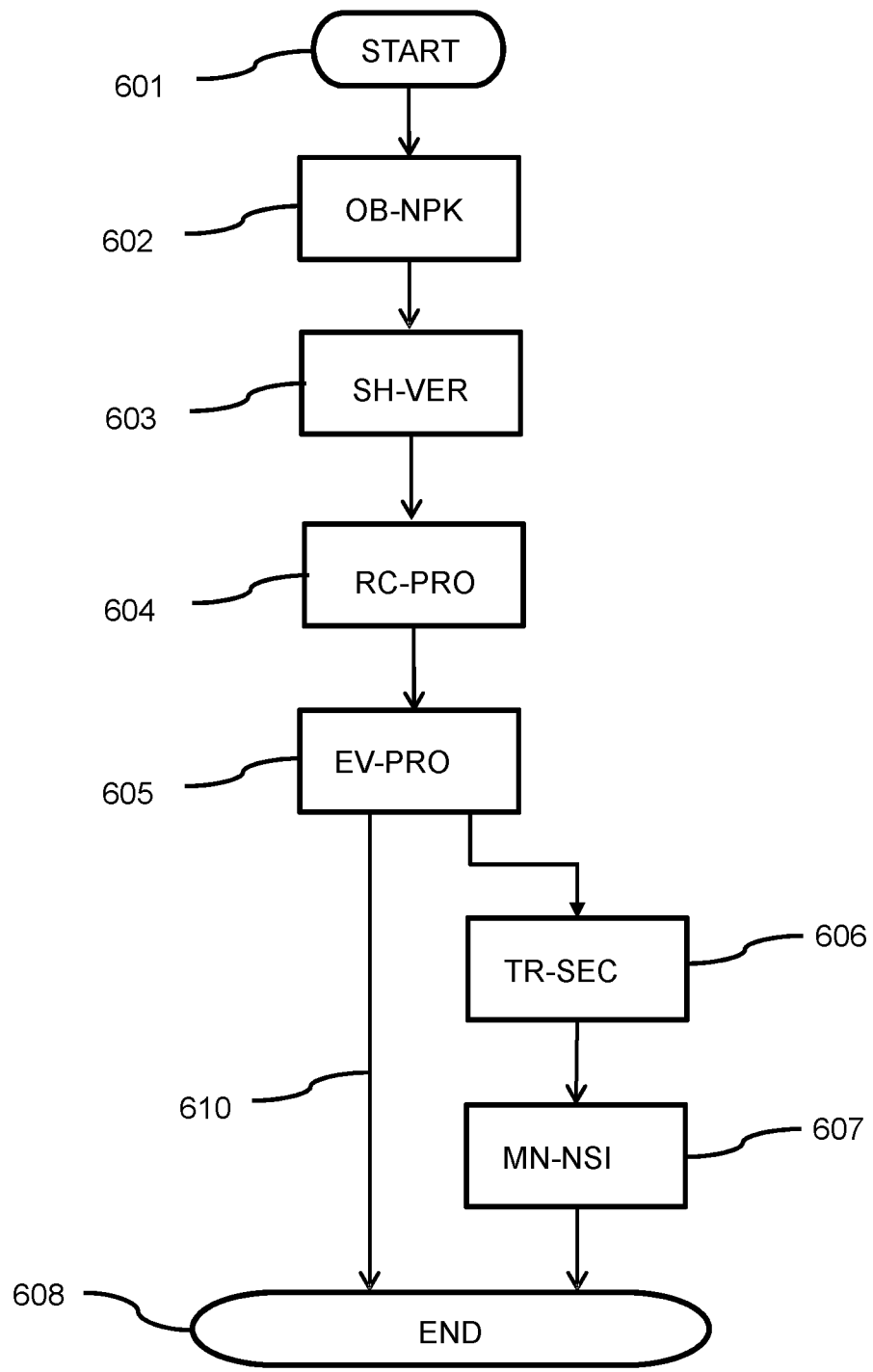
FIG. 6 shows a method for use in a SI device arranged for wireless communication with a non-SI device.

FIG. 6 shows a method for use in a SI device arranged for wireless communication with a non-SI device. The devices have been described above. The method may be executed, for example, by circuitry and software in a processor in a stationary or mobile computing device.

In the method, an association sequence is executed and starts at node START 601. In a first stage, OB-NPK 602, the non-SI public key is obtained from the non-SI device via a first communication channel. Thereto the first communication channel is set up, e.g. via a wireless network such as Wi-Fi. The first channel may also be an OOB channel as elucidated above, for example, the non-SI public key may be obtained by the SI device by scanning a printed QR code.

In a next stage SH-VER 603, a verification code is shared with the SI device via a second communication channel. Thereto the second communication channel is set up, e.g. via a wireless communication different from the first communication channel. The first and second communication channel are different, while one of the first and second communication channel is an OOB channel. For example, the verification code may be shared via an OOB channel by displaying the code on the SI device, while the user has to enter the code manually on the non-SI device. In a next stage, RC-PRO 604, proof of possession of the non-SI private key is received, using any of the protocols for this mentioned before via the first or the second communication channel, which non-SI private key constitutes a pair with the non-SI public key from the non-SI device In a next stage EV-PRO 605, the received proof is evaluated, and if the evaluation of the proof is not successful, the method terminates as indicated by arrow 610 to node END 608. No security data is obtained, e.g. after a predetermined timeout period. Also, an abort message may be sent that no security data is available. If the proof has been successfully evaluated, the SI device may obtain the security data as described above, and send the security data to the non-SI device in a next stage TR-SEC 606.

Finally, in an optional stage MN-NSI 607, while the security data enables the non-SI device to access the core network via the local network and a gateway between the local network and the core network, the access and/or use of the core network by the non-SI device may be monitored, e.g. monitoring the location of the non-SI device, or the access, services and/or traffic of the non-SI device. The association sequence is terminated in node END 608.

Many different ways of implementing the methods are possible, as will be apparent to a person skilled in the art. For example, the order of the stages or steps can be varied or some stages may be executed in parallel. Moreover, in between steps other method steps may be inserted. The inserted steps may represent refinements of the method such as described herein or may be unrelated to the method.

Computer program products, downloadable from a network and/or stored on a computer-readable medium and/or microprocessor-executable medium, are provided that comprise program code instructions for implementing the above method, connection sequence, security process and further operations when executed on a computer device. So, the method according to the invention may be executed using software, which comprises instructions for causing a processor system to perform the respective method.

Typically, the non-SI device and the SI device that interact to execute the association sequence, each comprise a processor coupled to a memory containing appropriate software code stored at the devices; for example, that software may have been downloaded and/or stored in a corresponding memory, e.g., a volatile memory such as RAM or a non-volatile memory such as Flash (not shown). The devices may for example be equipped with microprocessors and memories (not shown). Alternatively, the devices may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
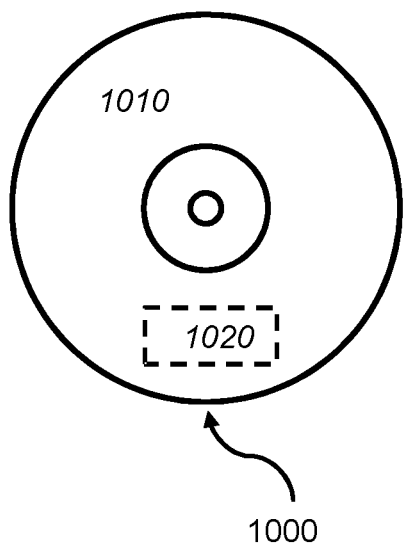
FIG. 7a shows a computer readable medium.

FIG. 7a shows a computer readable medium 1000 having a writable part 1010 comprising a computer program 1020, the computer program 1020 comprising instructions for causing a processor system to perform one or more of the above methods and processes in the system as described with reference to FIGS. 1-6. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 7B:
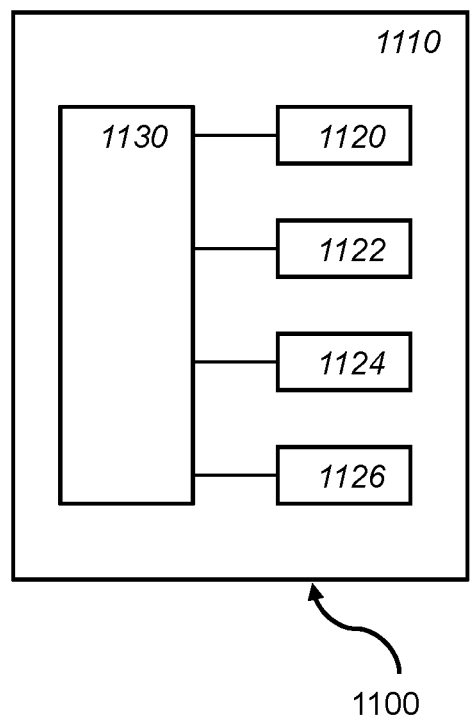
FIG. 7b shows in a schematic representation of a processor system.

FIG. 7b shows in a schematic representation of a processor system 1100 according to an embodiment of the devices or methods as described with reference to FIGS. 1-6. The processor system may comprise a circuit 1110, for example one or more integrated circuits. The architecture of the circuit 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, a transceiver, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for wired and/or wireless communication, using connectors and/or antennas, respectively.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the verb 'comprise' does not exclude the presence of elements or steps other than those listed and the word 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. Any reference signs do not limit the scope of the claims. The invention may be implemented by means of both hardware and software. Several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

In summary, a non-SI device is arranged for wireless communication and cooperates with an SI device having access to the subscriber identity. The non-SI device has a transceiver to communicate in a local network and a processor to establish an association with the SI. A non-SI public key is provided to the SI device via a first communication channel. A verification code is shared with the SI device via a second communication channel. The channels are different and include an out-of-band, OOB, channel. Proof of possession of a non-SI private key is provided to the SI device via the first or the second communication channel. From the SI device, security data is received that is related to the SI and is computed using the non-SI public key. The security data reliably enables the non-SI device to access the core network via the local network and a gateway between the local network and the core network.

REFERENCE DOCUMENTS

[802.11] IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), December 2016

[DH] Diffie, W.; Hellman, M. (1976), "New directions in cryptography", IEEE Transactions on Information Theory, 22 (6): 644-654

[DPP] Device Provisioning Protocol—Technical Specification—Version 1.0, Wi-Fi Alliance, 2018

[HOTSPOT] Hotspot 2.0 (Release 2) Technical Specification Package (see http://www.wi-fi.org/discover-wi-fi/passpoint)

[RFC 4301] "Security Architecture for the Internet Protocol", December 2005, http://datatracker.ieft.org/doc/rfc/4301/

[RFC 5246] "The Transport Layer Security (TLS) Protocol, Version 1.2", August 2008, http://datatracker.ietf.org/doc/rfc5246/

[RFC 6101] "The Secure Sockets Layer (SSL) Protocol Version 3.0", August 2011, http://datatracker.ietf.org/doc/rtc6101/

[TS 23.402] 3rd Generation Partnership Project; Technical Specification Group Services and System Aspects; Architecture enhancements for non-3GPP accesses (Release 15); 3GPP TS 23.402 V15.3.0 (2018-03) http://www.3gpp.org/ftp//Specs/archive/23_series/23.402/23402-f30.zip

[TS 24.302] 3rd Generation Partnership Project; Technical Specification Group Core Network and Terminals; Access to the 3GPP Evolved Packet Core (EPC) via non-3GPP access networks; Stage 3 (Release 15); 3GPP TS 24.302 V15.3.0 (2018-06)

[TS 33.402] 3rd Generation Partnership Project; Technical Specification Group Services and System Aspects; 3GPP System Architecture Evolution (SAE); Security aspects of non-3GPP accesses (Release 15); 3GPP TS 33.402 V15.1.0 (2018-06)

The invention claimed is:

1. A non-subscriber identity ("non-SI") device arranged for wireless communication in a local network according to a local communication protocol,
   wherein the local communication protocol defines protocol messages and wireless transceiving across a limited area,
   the non-SI device not comprising an SI and being arranged for cooperating with an SI device having access to the subscriber identity ("SI"),
   the SI comprising subscriber identity data of a subscriber to a provider for accessing a core network, the core network providing wireless communication for mobile devices across at least a regional area,
   the non-SI device comprising:
      a non-SI private key constituting a pair with a non-SI public key;
      a transceiver arranged for local transceiving according to the local communication protocol;
      a processor arranged to execute an association sequence to establish an association with the SI, the association sequence comprising:
         providing the non-SI public key to the SI device via a first communication channel,
         sharing a verification code with the SI device via a second communication channel for verifying that the SI device has obtained the non-SI public key, wherein the first and second communication channel being different and one of the channels being an out-of-band ("OOB") channel,
         providing proof of possession of the non-SI private key to the SI device via the first or the second communication channel,
         receiving, from the SI device, security data as generated on behalf of the provider using the non-SI public key, the security data enabling the non-SI device to access the core network.

2. The device of claim 1, wherein the association sequence comprises providing a secure channel as the other channel of the first and second communication channel by engaging:

a secure socket layer, SSL [RFC 6101], protocol or a transport layer security, TLS [RFC 5246], protocol with the non-SI device acting as server, where the non-SI device provides the non-SI public key in a self-signed certificate and uses this certificate as a server certificate in a server certificate message; or an SSL or TLS protocol as with the non-SI device acting client, where the non-SI device provides the non-SI public key in a self-signed certificate in a client-authenticated handshake; or an internet protocol security, IPsec [RFC 4301], tunnel set up by public key encryption in which the non-SI public key or non-SI private key is used; or a device provisioning protocol, DPP [DPP], Authentication protocol, where the non-SI device provides the non-SI public key or a further non-SI public key as DPP bootstrapping key or as DPP protocol key.

3. The device of claim 2, wherein said receiving the security data comprises receiving the security data via the secure channel.

4. The device of claim 1, wherein the OOB channel provided via one of the group:
   a short range radio communication protocol,
   a visual channel providing a visual code at the non-SI device side and a scanner or camera at the SI device side,
   a user channel where a code is displayed at the SI device side and is to be entered at the non-SI-system side,
   a user channel where a code is displayed at the non-SI device side and is to be entered at the SI-system side,
   a user channel where a code is displayed at the non-SI device side and is to be compared to a further code at the SI-device side, and
   a user channel where a code is to be entered in the non-SI device and a related code is to be entered in the SI device.

5. The device of claim 1, wherein the security data comprises credentials related to the SI, at least part of the credentials being encrypted using the non-SI public key.

6. The device of claim 1, wherein the non-SI public key comprises a first non-SI public key and a second non-SI public key, respectively corresponding to a first non-SI private key and a second non-SI private key, and
   the first non-SI public key being initially provided to the SI device via the OOB channel, and the second non-SI public key being subsequently used for said generating the security data.

7. The device of claim 1, wherein the processor is further arranged for:
   receiving heart beat messages from the SI device, the SI device transferring the heart beat messages upon receiving the heart beat messages from the core network, and
   transferring the heart beat messages to the core network via the gateway;
   thereby enabling the core network to disable the access of the non-SI device to the core network upon, during a predetermined interval, not receiving the heart beat messages from the non-SI device.

8. The device of claim 1, wherein the processor is further arranged for managing a multitude of user accounts, and for:
   selectively for respective user accounts executing the association sequence to establish multiple respective instances of security data, and
   selectively for a respective user account enabling the non-SI device to access the core network based on the respective instance of security data.

9. The device of claim 1, wherein the processor is further arranged for:
   receiving heart beat messages from the core network via the gateway and
   transferring the heart beat messages to the SI device, the SI device transferring the heart beat messages to the core network;
   thereby enabling the core network to disable the access of the non-SI device to the core network upon, during a predetermined interval, not receiving the heart beat messages from the SI device.

10. A subscriber identity ("SI") device arranged for wireless communication with a non-SI device, the SI device having access to an SI,
   the SI comprising subscriber identity data of a subscriber to a provider for accessing a core network, the core network providing wireless communication for mobile devices across at least a regional area,
   the SI device comprising:
      a transceiver arranged for wireless communication with the non-SI device,
      a processor arranged to execute an association sequence to establish an association with the SI, the association sequence comprising:
         obtaining a non-SI public key from the non-SI device via a first communication channel,
         sharing a verification code with the non-SI device via a second communication channel for verifying that the SI device has obtained the non-SI public key, wherein the first and second communication channel being different and one of the channels being an out-of-band("OOB") channel,
         receiving, via the first or the second communication channel, proof of possession of a non-SI private key that constitutes a pair with the non-SI public key from the non-SI device,
         wherein upon successful evaluation of the received proof, obtaining security data as generated on behalf of the provider using the non-SI public key, and
         transmitting the security data to the non-SI device, wherein the security data enables the non-SI device to access the core network.

11. The SI device of claim 10, comprising:
   a subscriber identity module, SIM, comprising the subscriber identity data;
   a further transceiver arranged for wireless communication with the core network.

12. The SI device of claim 10, wherein the processor is arranged to receive heart beat messages from the core network and transfer the heart beat messages to the non-SI device, thereby enabling the core network to disable the access of the non-SI device to the core network upon, during a predetermined interval, not receiving the heart beat messages from the non-SI device.

13. The SI device of claim 10, wherein the processor is arranged to:
   receive and relay a certain part of data communication between the non-SI device and the core network, while encrypting part of the relayed data using a key related to the SI, for determining that the data communication of the non-SI device is enabled via the SI device.

14. The SI device of claim 10, wherein the processor is arranged:
   to determine whether a location of the non-SI device is within an allowed range, or to measure whether a distance between the SI device and the non-SI device is within the allowed range, for enabling the core network to disable the access of the non-SI device to the core network upon finding that the non-SI device is not within the allowed range.

15. The SI device of claim 10, wherein the processor is arranged to receive heart beat messages from the non-SI device and transfer the heart beat messages to the core network, thereby enabling the core network to disable the access of the non-SI device to the core network upon, during a predetermined interval, not receiving the heart beat messages from the SI device.

16. A method for use in a non subscriber identity("non-SI") device arranged for wireless communication with an SI device, the SI device having access to an SI, the SI comprising subscriber identity data of a subscriber to a provider for accessing a core network, the core network providing wireless communication for mobile devices across at least a regional area, the non-SI device comprising a non-SI private key constituting a pair with a non-SI public key, the method comprising:

providing the non-SI public key to the SI device via a first communication channel, sharing a verification code with the SI device via a second communication channel for verifying that the SI device has obtained the non-SI public key, wherein the first and second communication channel being different and one of the channels being an out-of-band("OOB") channel, providing proof of possession of the non-SI private key to the SI device via the first or the second communication channel, receiving, from the SI device, security data as generated on behalf of the provider using the non-SI public key, wherein the security data enables the non-SI device to access the core network.

17. A non-transitory computer-readable medium comprising a program that, when executed by a processor causes the processor to perform the method of claim 16.

18. A method for use in a subscriber identity("SI") device arranged for wireless communication with a non-SI device, the SI device having access to an SI, the SI comprising subscriber identity data of a subscriber to a provider for accessing a core network, the core network providing wireless communication for mobile devices across at least a regional area, the method comprising obtaining a non-SI public key from the non-SI device via a first communication channel, sharing a verification code with the non-SI device via a second communication channel for verifying that the SI device has obtained the non-SI public key, wherein the first and second communication channel being different and one of the channels being an out-of-band, OOB, channel, receiving, via the first or the second communication channel, proof of possession of a non-SI private key that constitutes a pair with the non-SI public key from the non-SI device, wherein upon successful evaluation of the received proof, obtaining security data as generated on behalf of the provider using the non-SI public key, and transmitting the security data to the non-SI device, wherein the security data enables the non-SI device to access the core network.

19. A non-transitory computer-readable medium comprising a program that, when executed by a processor causes the processor to perform the method of claim 18.

\* \* \* \* \*